(12) United States Patent
Tominaga

(10) Patent No.: US 7,397,118 B2
(45) Date of Patent: Jul. 8, 2008

(54) CERAMIC CHIP-TYPE ELECTRONIC COMPONENT AND METHOD OF MAKING THE SAME

(75) Inventor: Yukio Tominaga, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 323 days.

(21) Appl. No.: 11/403,741

(22) Filed: Apr. 13, 2006

(65) Prior Publication Data

US 2006/0256495 A1 Nov. 16, 2006

(30) Foreign Application Priority Data

Apr. 14, 2005 (JP) ............................ 2005-117348

(51) Int. Cl.
*H01L 23/12* (2006.01)
*H01G 4/228* (2006.01)
(52) U.S. Cl. .................. 257/700; 257/701; 257/730; 257/E23.173; 361/306.1; 361/306.2; 361/306.3; 361/308.1; 361/310; 361/321.2

(58) Field of Classification Search ................. 257/688, 257/700, 703, 730, 734, 735, E23.113; 361/306.1, 361/306.2, 306.3, 307, 308.1, 310, 312, 313, 361/321.2
See application file for complete search history.

(56) References Cited

U.S. PATENT DOCUMENTS

| | | | | |
|---|---|---|---|---|
| 3,679,950 | A * | 7/1972 | Rutt ........................ | 361/321.4 |
| 5,432,378 | A * | 7/1995 | Whitney et al. ............ | 257/529 |
| 5,561,587 | A * | 10/1996 | Sanada .................... | 361/306.1 |
| 5,805,409 | A * | 9/1998 | Takahara et al. ........... | 361/303 |
| 5,862,034 | A * | 1/1999 | Sato et al. ................ | 361/321.5 |
| 6,441,459 | B1 * | 8/2002 | Togashi et al. ............. | 257/532 |
| 6,831,360 | B2 * | 12/2004 | Yamaura et al. ............ | 257/724 |
| 7,362,559 | B2 * | 4/2008 | Tominaga ................ | 361/306.1 |
| 2001/0035563 | A1 * | 11/2001 | Masumiya et al. ......... | 257/532 |
| 2002/0041006 | A1 * | 4/2002 | Ahiko et al. ................ | 257/532 |

FOREIGN PATENT DOCUMENTS

JP 2004-296936 10/2004

* cited by examiner

*Primary Examiner*—Jasmine J Clark
(74) *Attorney, Agent, or Firm*—Hamre, Schumann, Mueller & Larson, P.C.

(57) ABSTRACT

A chip-type electronic component includes a ceramic chip body, an external electrode formed on the chip body, a conductive elastic resin film made of a mixture of metal powder and elastic resin and formed to cover the external electrode, and a metal plating film. The metal powder is exposed at an obverse surface of the conductive elastic resin film. The metal plating film is formed on the obverse surface of the conductive elastic resin film at which the metal powder is exposed.

3 Claims, 2 Drawing Sheets

CERAMIC CHIP-TYPE ELECTRONIC COMPONENT AND METHOD OF MAKING THE SAME

BACKGROUND OF THE INVENTION

1. Field of the Invention

The present invention relates to a ceramic chip-type electronic component such as a multilayer ceramic capacitor or a chip resistor, and to a method of making such an electronic component.

2. Description of the Related Art

Conventionally, a multilayer ceramic capacitor generally includes a chip body and a plurality of external electrodes. The chip body is formed by sintering a plurality of ceramic green sheets laminated one upon another. An internal electrode is provided on an obverse surface of each of the ceramic green sheets. The external electrodes are formed by sputtering of metal such as copper or by the application of metal paste such as copper paste, for example. Each of the internal electrodes is electrically connected to one of the external electrodes.

The multilayer ceramic capacitor having the above-described structure has a drawback that the chip body easily cracks or chips. For instance, when the multilayer ceramic capacitor is soldered on e.g. a printed circuit board, such cracking or chipping may occur due to the shock from the outside or the thermal expansion difference between the multilayer ceramic capacitor and the printed circuit board.

To prevent such cracking or chipping, JP-A-2004-296936 proposes to cover each of the external electrodes by a conductive elastic resin film containing metal powder. The elasticity of the conductive elastic resin film functions to absorb the shock from the outside to the chip body or the thermal expansion difference. Further, to facilitate the soldering, a metal plating film is formed on the conductive elastic resin film.

According to the above-described patent document, the conductive elastic resin film is formed by applying elastic resin paste mixed with metal powder by e.g. screen printing and then drying or hardening the paste applied. With such a technique, however, the metal powder existing at a surface of the conductive elastic resin film is covered by a thin film of elastic resin and is not exposed.

Since the metal powder is not exposed, the adhesion between the metal plating film and the conductive elastic resin film may be poor. Therefore, the metal plating film may be separated due to the shock from the outside or the thermal expansion difference between the multilayer ceramic capacitor and the printed circuit board. Moreover, since the metal powder is not exposed, any measures may need to be taken to enhance the adhesion between the metal plating film and the conductive elastic resin film, which leads to an increase in the manufacturing cost.

SUMMARY OF THE INVENTION

The present invention is conceived under the above-described circumstances. It is, therefore, an object of the present invention is to provide an electronic component which can be manufactured at a low cost and in which the separation of e.g. a metal plating film or the cracking or chipping of the chip body is unlikely to occur. Another object of the present invention is to provide a method of making such an electronic component.

According to a first aspect of the present invention, there is provided a chip-type electronic component comprising: a ceramic chip body; an external electrode formed on a side surface of the chip body; a conductive elastic resin film made of a mixture of metal powder and elastic resin and formed to cover the external electrode; and a metal plating film. In the chip-type electronic component, the metal powder is exposed at an obverse surface of the conductive elastic resin film, and the metal plating film is formed on the obverse surface of the conductive elastic resin film at which the metal powder is exposed.

In such a structure, the metal powder is exposed at the obverse surface of the conductive elastic resin film. Therefore, the metal plating film can directly bond to the metal powder. Therefore, the formation of the metal plating film does not require any additional cost.

Moreover, with the above-described structure, the adhesion between the metal plating film and the conductive elastic resin film is enhanced. Therefore, it is possible to prevent the separation of the metal plating film due to the shock from the outside or the thermal expansion difference between the multilayer ceramic capacitor and the printed circuit board.

According to a second aspect of the present invention, there is provided a manufacturing method comprising the steps of: forming, on a side surface of a ceramic chip body incorporating an element, an external electrode for the element; forming a conductive elastic resin film containing metal powder on the external electrode; subjecting the conductive elastic resin film to surface treatment for causing the metal powder contained in the conductive elastic resin film to be exposed at an obverse surface of the conductive elastic resin film; and forming, on the obverse surface of the conductive elastic resin film, a metal plating film for soldering.

In the above-described method, the metal powder is easily exposed at the obverse surface of the conductive elastic resin film by the surface treatment of the conductive elastic resin film. Therefore, an increase in the manufacturing cost can be prevented.

Preferably, the surface treatment of the conductive elastic resin film comprises polishing such as barrel polishing or sand blasting. In such a case, the manufacturing cost is further reduced.

DETAILED DESCRIPTION OF THE PREFERRED EMBODIMENTS

A preferred embodiment of the present invention will be described below in detail with reference to the accompanying drawings.

Figure 1:
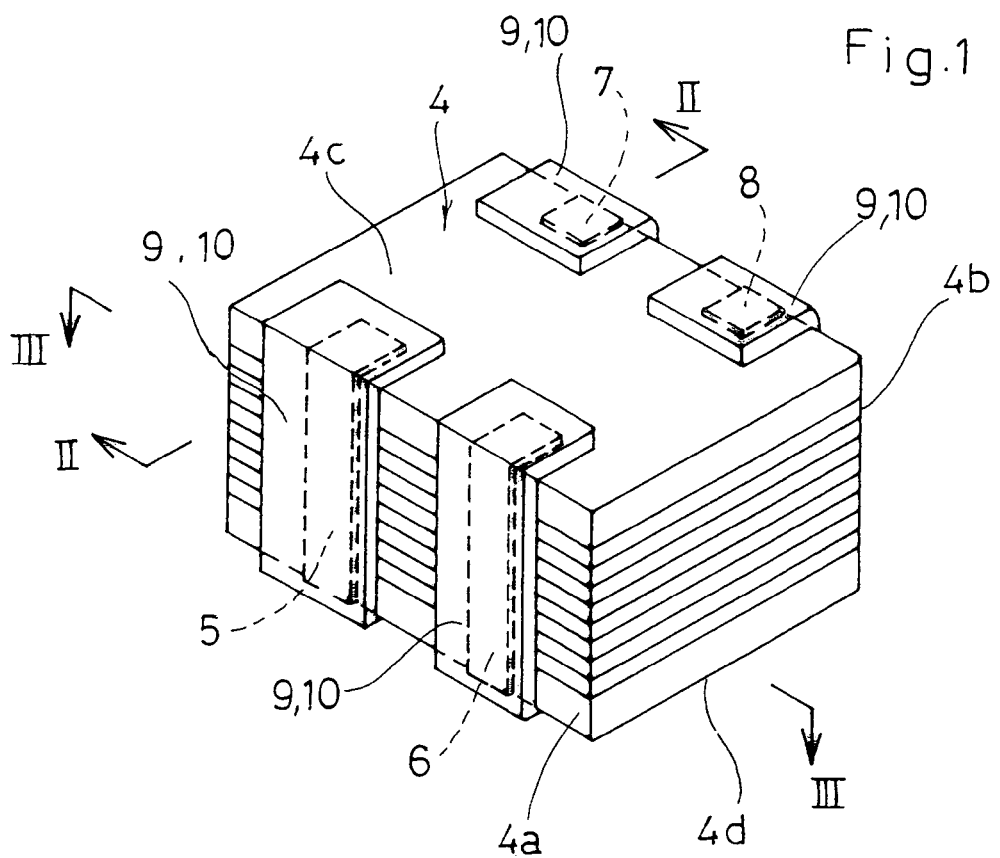
FIG. 1 is a perspective view showing a multilayer ceramic capacitor according to the present invention.
Figure 2:
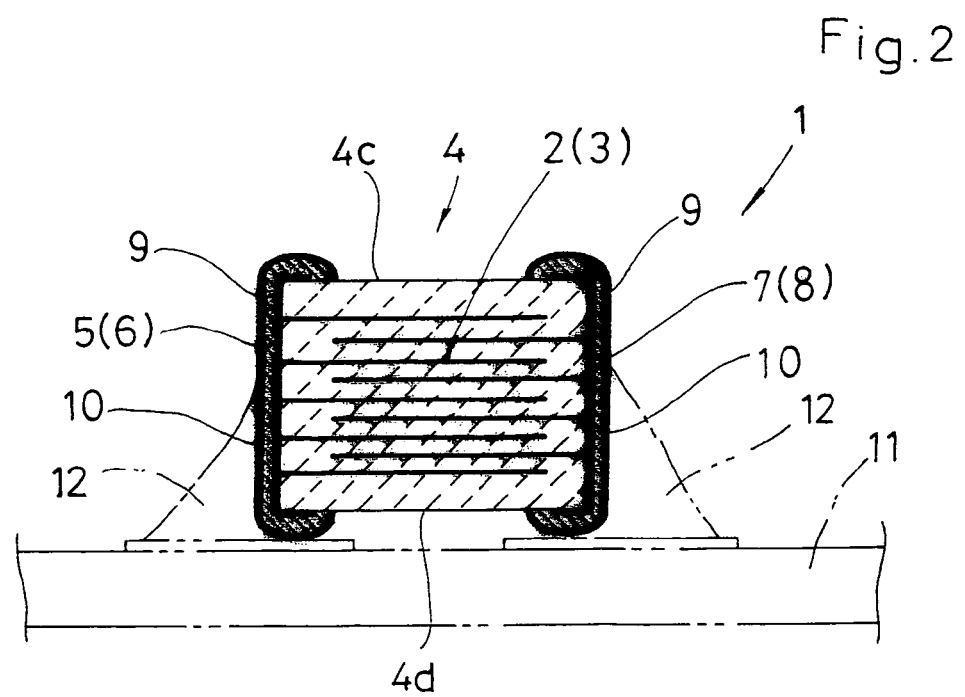
FIG. 2 is a sectional view taken along lines II-II in FIG. 1.
Figure 3:
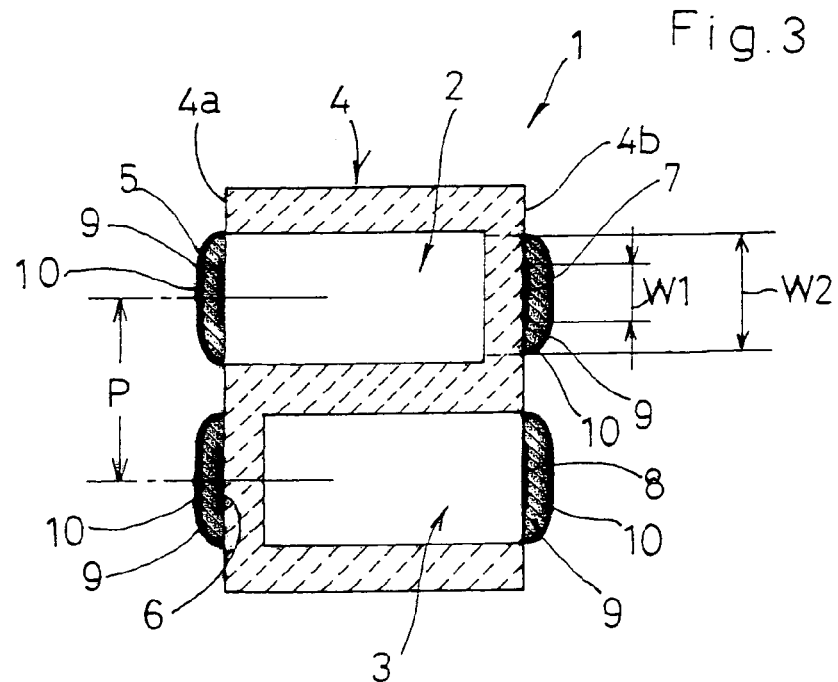
FIG. 3 is a sectional view taken along lines III-III in FIG. 1.

FIGS. 1-3 show a multilayer ceramic capacitor according to an embodiment of the present invention. The multilayer ceramic capacitor 2 is of a two-element type. In other words, the capacitor functions as two capacitor elements 2 and 3, as shown in FIG. 3.

As shown in FIG. 1, the multilayer ceramic capacitor 1 includes a chip body 4, external electrodes 5, 6, 7, 8, conductive elastic resin films 9, and metal plating films 10.

The external electrodes 5 and 7 are the parts for the capacitor element 2, whereas the external electrodes 6 and 8 are the parts for the other capacitor element 3. The external electrodes 5 and 6 are provided on a side surface 4a of the chip body 4, whereas the external electrodes 7 and 8 are provided on a side surface 4b opposite to the side surface 4a. Each of the external electrodes 5-8 has opposite ends partially covering an upper surface 4c and a lower surface 4c of the chip body 4, respectively. The external electrodes 5-8 may be formed appropriately by sputtering of metal such as copper or by the application of metal paste such as copper paste, for example.

The chip body 4 is formed by sintering a plurality of ceramic green sheets laminated one upon another. The obverse surface of each of the green sheets is provided with an internal electrode which is a part for the capacitor element 2, 3. Each of the internal electrodes is electrically connected to one of the external electrodes 5, 6, 7 and 8.

The four conductive elastic resin films 9 are films having conductivity and made of a mixture of synthetic resin having elasticity and metal powder such as silver. The conductive elastic resin films 9 are formed on part of the side surface 4a, 4b, part of the upper surface 4c and part of the lower surface 4d of the chip body 4 to cover the entirety of the external electrodes 5, 6, 7 and 8. The width W1 of each of the external electrodes 5, 6, 7 and 8 is set to not more than 0.6 times the width W2 of each of the conductive elastic resin films 9.

Each of the conductive elastic resin films 9 may be formed as follows. First, conductive elastic resin paste is applied by screen printing, for example. Then, the paste applied is fixed by drying or hardening.

Subsequently, the obverse surface of the fixed paste is subjected to surface treatment such as barrel polishing or sand blasting for polishing the surface. Specifically, in the case of barrel polishing, a plurality of chip bodies 4 formed with conductive elastic resin films 9 thereon are placed in a container along with abrasive particles, and the container is rotated. In the case of sand blasting, abrasive particles are sprayed with air. In this way, the conductive elastic resin film 9 having an obverse surface at which metal powder is exposed is obtained.

Instead of the above-described surface treatment, chemical surface treatment such as removing part of the synthetic resin by etching may be performed.

The metal plating films 10 may be formed by performing electrolytic plating such as barrel plating or electroless plating after the above-described surface treatment of the conductive elastic resin films 9. Specifically, for example, a nickel plating film as an underlayer is formed on the entire surface of each of the conductive elastic synthetic films 9, and then the metal plating film 10 such as a tin plating film or a solder plating film is formed thereon.

FIG. 2 shows the multilayer ceramic capacitor 1 of the present invention soldered on a printed circuit board 11. The external electrodes 5, 6, 7 and 8 are covered by conductive elastic resin films 9. On the conductive elastic resin films 9, metal plating films 10 are provided. Solder fillets 12 are formed on the metal plating films 10.

The chip body 4 is supported horizontally by the solder fillets 12 via the conductive elastic resin films 9. Further, the chip body 4 is supported vertically by the printed circuit board 11 via the conductive elastic resin films 9. Therefore, the elasticity of the conductive elastic resin film 9 absorbs the shock from the outside to the chip body 4 or the thermal expansion difference between the multilayer ceramic capacitor and the printed circuit board 10. As a result, the cracking or chipping due to such shock or thermal expansion difference can be effectively prevented.

Further, each of the conductive elastic resin films 9 has a width which is larger than that of each external electrode 5-8 and is held in contact with both the external electrode 5-8 and the chip body 4. Therefore, the bonding of the conductive elastic resin film 9 to the chip body 4 and to the external electrode 5-8 is reliably maintained.

Further, the metal plating film 10 is directly bonded to the metal powder exposed at the obverse surface of the conductive elastic resin film 9. Therefore, the formation of the metal plating film 10 is easy, and the adhesion strength between the metal plating film 10 and the conductive elastic resin film 9 is enhanced.

Figure 4:
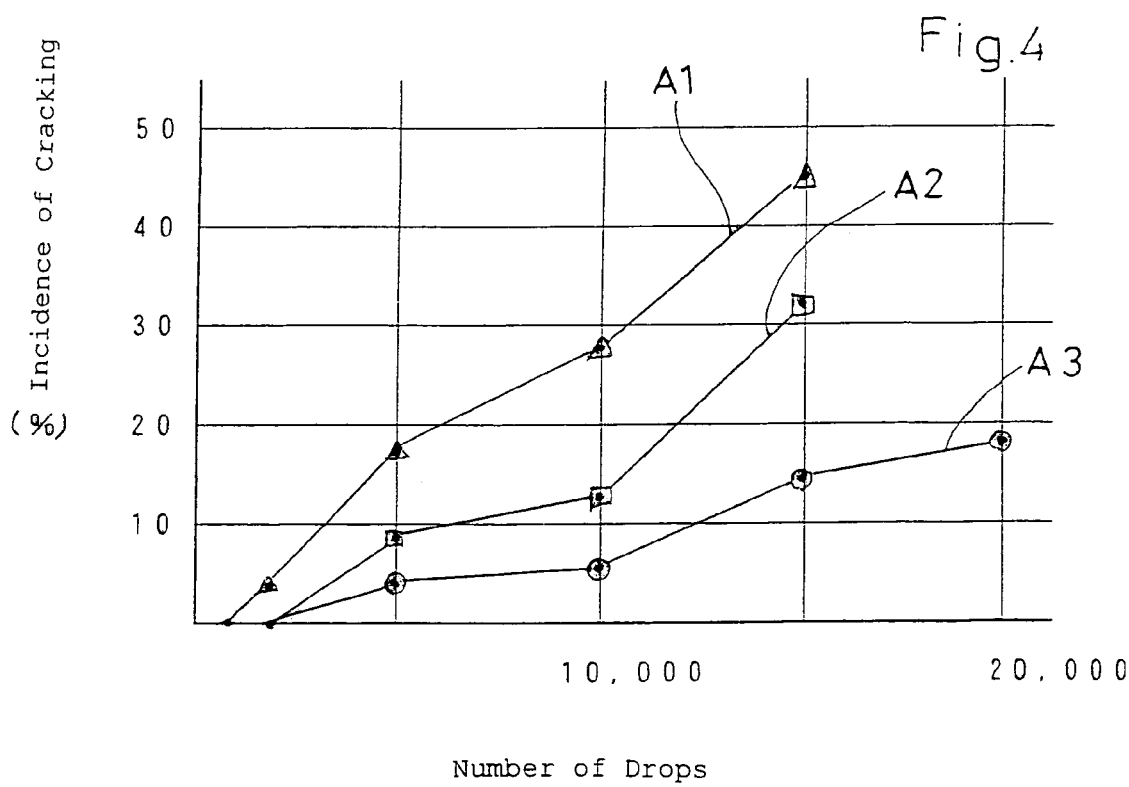
FIG. 4 is a graph showing the relationship between the number of dropping operations performed and the incidence of cracking.

FIG. 4 shows the relationship between the modulus of elasticity of the conductive elastic resin film 9 and the incidence of cracking or chipping, which is obtained by the experiment performed by the inventors of the present invention.

In the graph of the figure, the abscissa shows the number of dropping operations performed, i.e., how many times a multilayer ceramic capacitor 1 soldered to a printed circuit board 12 was dropped from one meter. The ordinate shows the incidence of cracking. The plurality of lines in the graph shows the incidences of cracking in the case of utilizing conductive elastic resin films 9 of different modulus of elasticity. Specifically, the lines A1, A2 and A3 indicate the incidences of cracking in the case of utilizing the conductive elastic resin films having modulus of elasticity of 17.0 GPa, 9.1 GPa and 6.1 GPa, respectively. As can be understood from the graph, a lower modulus of elasticity provides a lower incidence of cracking.

The inventors of the present invention further performed a similar experiment with respect to conductive elastic resin films 9 which were different from each other in ratio between the width W2 thereof and the width W1 of the external electrodes 5-8. From the experimental results, it was found that when the width W1 exceeds 0.6 times the width W2, the incidence of separation of the conductive elastic resin film 9 from the chip body 4 increases remarkably. This is because the contact area between the conductive elastic resin film 9 and the chip body 4 is reduced so that the adhesion therebetween becomes insufficient. Therefore, although it is desirable to make the width W1 of each external electrode as large as possible to reduce the resistance of the external electrode, the width W1 should not exceed 0.6 times the width W2.

The pitch P between two external electrodes provided adjacent to each other on a same side surface 4a or 4b is determined in advance. The width W2 of each conductive elastic resin film 9 should be determined in view of the predetermined pitch P so that a solder bridge is not formed between the metal plating films 10 on the adjacent conductive elastic resin films 9 in soldering.

The present invention being thus described, it is apparent that the same may be varied in many ways. For instance, although the multilayer ceramic capacitor 1 in the above-described embodiment incorporates two capacitor elements, the present invention is not limited thereto. The present invention is also applicable to a multilayer ceramic capacitor incorporating a single capacitor element or three or more capacitor elements The present invention is also applicable to ceramic chip-type electronic components other than a capacitor, such as a chip resistor, a chip inductor or a chip LED, for example. Such variations should not be regarded as a departure from the spirit and scope of the present invention, and all such modifications as would be obvious to those skilled in the art are intended to be included within the scope of the following claims of the present invention.

The invention claimed is:
1. A chip-type electronic component comprising:
a ceramic chip body;
an external electrode formed on a side surface of the chip body;
a conductive elastic resin film made of a mixture of metal powder and elastic resin and formed to cover the external electrode; and
a metal plating film;
wherein the metal powder is exposed at an obverse surface of the conductive elastic resin film, and wherein the metal plating film is formed on the obverse surface of the conductive elastic resin film at which the metal powder is exposed.

2. A method of making a ceramic chip-type electronic component comprising the steps of:

forming, on a side surface of a ceramic chip body incorporating an element, an external electrode for the element;
forming a conductive elastic resin film containing metal powder on the external electrode;
subjecting the conductive elastic resin film to surface treatment for causing the metal powder contained in the conductive elastic resin film to be exposed at an obverse surface of the conductive elastic resin film; and
forming, on the obverse surface of the conductive elastic resin film, a metal plating film for soldering.

3. The making method according to claim 2, wherein the surface treatment of the conductive elastic resin film comprises polishing.

* * * * *